United States Patent [19]

Matsumoto et al.

[11] Patent Number: 5,104,833
[45] Date of Patent: Apr. 14, 1992

[54] REFRACTORY FOR CASTING A BASIC SUBSTANCE

[75] Inventors: Osami Matsumoto; Toshihiro Isobe, both of Hyogo; Hisashi Matsuoka; Yasuhisa Abe, both of Aichi, all of Japan

[73] Assignees: Harima Ceramic Co. Ltd., Hyogo; Nippon Steel Corporation, Tokyo, both of Japan

[21] Appl. No.: 632,996

[22] Filed: Dec. 24, 1990

[51] Int. Cl.$^5$ ............................................ C04B 35/48
[52] U.S. Cl. .................................. 501/104; 501/106; 501/108; 501/95
[58] Field of Search ............... 501/104, 106, 108, 95

[56] References Cited

U.S. PATENT DOCUMENTS

| 1,440,657 | 1/1923 | Buckman et al. | 501/106 |
| 1,952,119 | 3/1934 | Comstock | 501/106 |
| 1,952,120 | 3/1934 | Comstock | 501/106 |

FOREIGN PATENT DOCUMENTS

| 52-140429 | 11/1977 | Japan . | |
| 53-26734 | 3/1978 | Japan . | |
| 57-92581 | 6/1982 | Japan . | |
| 60-60986 | 4/1985 | Japan . | |
| 1014176 | 1/1986 | Japan | 501/95 |

OTHER PUBLICATIONS

*Transactions of the English Ceramic Society* Part 1, vol. 29, No. 5 (May 1930) Rees et al., "A Preliminary Investigation of the Magnesia-Zircon Series" pp. 309-316.

Primary Examiner—William R. Dixon, Jr.
Assistant Examiner—Paul Marcantoni
Attorney, Agent, or Firm—Wenderoth, Lind & Ponack

[57] ABSTRACT

A refractory for casting a basic substance comprises 100 parts by weight of a refractory aggregate having as main ingredients 3 to 40% by weight of zircon and 97 to 60% by weight of magnesia and a suitable amount of a binding agent. Another refractory for casting a basic substance comprises 100 parts by weight of a refractory aggregate having as main ingredients 3 to 40% by weight of zircon and 97 to 60% by weight of magnesia, not more than 7 parts by weight of metallic fibers, and a suitable amount of a binding agent. The refractories for casting a basic substance are used for ladles, tundishes, vacuum degasing furnaces, mixers, and the like.

3 Claims, 4 Drawing Sheets

FINE ZIRCON PARTICLES NOT MORE THAN
0.5mm IN DIAMETER (% BY WEIGHT)

REFRACTORY FOR CASTING A BASIC SUBSTANCE

BACKGROUND OF THE INVENTION

This invention relates to a refractory having excellent spalling resistance for use in casting a basic substance.

A castable refractory having magnesia as a main ingredient has long been used as a lining material for ladles, tundishes, vacuum degasing furnaces, mixers, etc. Such a refractory will hereinafter be referred to as a "basic casting material".

Basic casting materials have excellent resistance to erosion by highly basic slags and do not contaminate molten steel. Consequently, they are suitable for conversion of molten steel into clean steel. On the other hand, they suffer conspicuously from thermal spalling and structural spalling due to penetration of slag and therefore can not fully manifest the benefits expected of basic substances.

Various proposals have been made to solve the problem of spalling by basic casting refractories. The incorporation of carbon is basic casting materials having magnesia as a principal ingredient (Japanese Provisional Patent Publication No. 57-92,581), the incorporation of alumina (Japanese Provisional Patent Publication No. 60-60,986), the incorporation of silica in an amount not less than 80% by weight (Japanese Provisional Patent Publication No. 53-26,734), and the incorporation of chromium ore (Japanese Provisional Patent Publication No. 52-140,429) are examples of such proposals.

However, none of the above-mentioned proposals can be described as totally satisfactory. To be specific, the carbon-containing material suffers from inferior erosiono resistance due to oxidation of carbon. The addition of alumina causes spinel due to the reaction of alumina with magnesia and also causes cracks or exfoliation due to expansion. The incorporation of silica results in reduced erosion resistance due to formation of a $MgO-SiO_2$ type substance with a low melting point due to the reaction of silica with magnesia. Chromium ore is not sufficiently effective at preventing slag penetration and results in extensive structural spalling.

SUMMARY OF THE INVENTION

This invention, in the casting of a basic substance, provides a solution to the problem of spalling of basic cast substances without loss of the high degree of erosion resistance of the basic cast substance.

This invention is directed to a refractory for the casting of a basic substance comprising 100 parts by weight of a refractory aggregate having as main ingredients thereof 3 to 40% by weight of zircon and 97 to 60% by weight of magnesia and a suitable amount of a binding agent.

Description of the Preferred Embodiments

Figure 1:
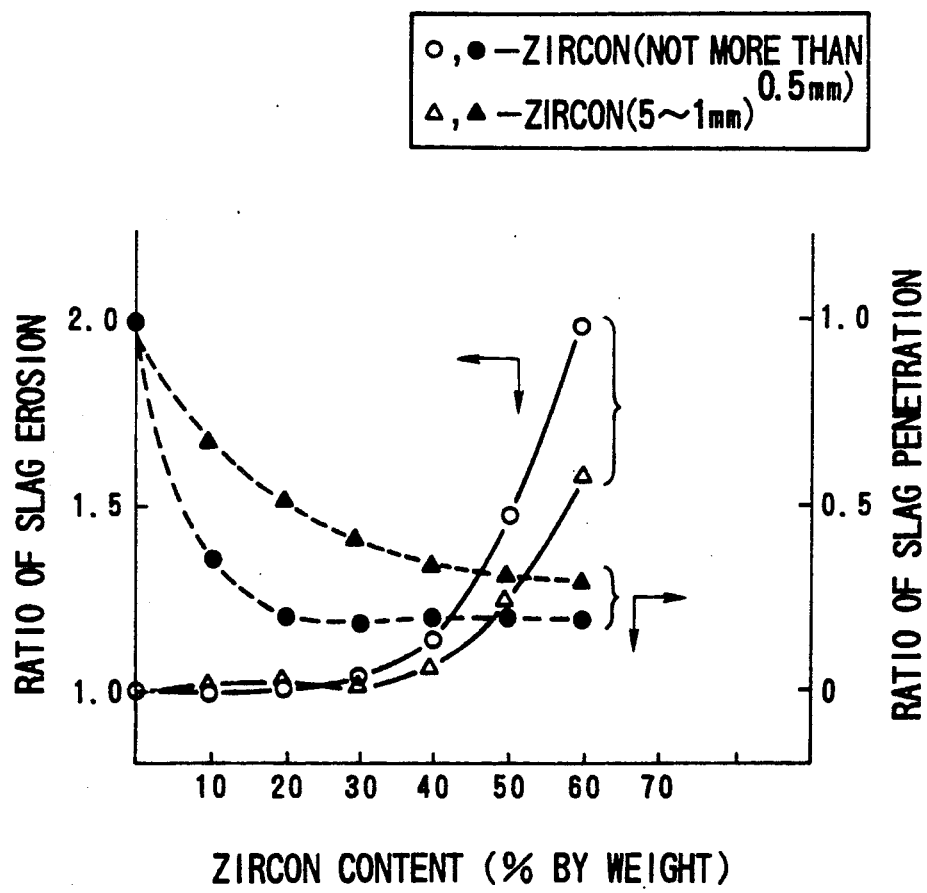
FIG. 1 is a graph showing the relation of erosion resistance to slag and resistance to slag penetration to the amount of zircon added.

FIG. 1 shows the relation of the ratio of slag erosion and the ratio of slag penetration to the zircon content in a zircon-containing basic casting material. The data were obtained using two species of zircon, one having particle diameters in the range of 5 to 1 mm and the other having particle diameters not exceeding 0.5 mm. From this graph, it can be seen that slag penetration is suppressed by the incorporation of zircon. Since the amount of slag erosion increases as the zircon content increases, it is clear that the proportion of zircon must be confined within a specific range.

At elevated temperatures, zircon dissociates into zirconia and silica liquid phase. The prevention of slag penetration by zircon is thought to occur because the highly viscous silica liquid phase resulting from the dissociation fills up the matrix of the texture of the refractory. As indicated by FIG. 1, zircon having particle diameters of not more than 0.5 mm is more effective than zircon having particle diameters in the range of 5 to 1 mm, probably because the aforementioned dissociation proceeds easily as the particle diameter of zircon decreases and the dissociated silica liquid phase is present in the matrix. The prevention of slag penetration inhibits oversintering due to reaction of slap and magnesium and consequently eliminates structural spalling.

Figure 2:
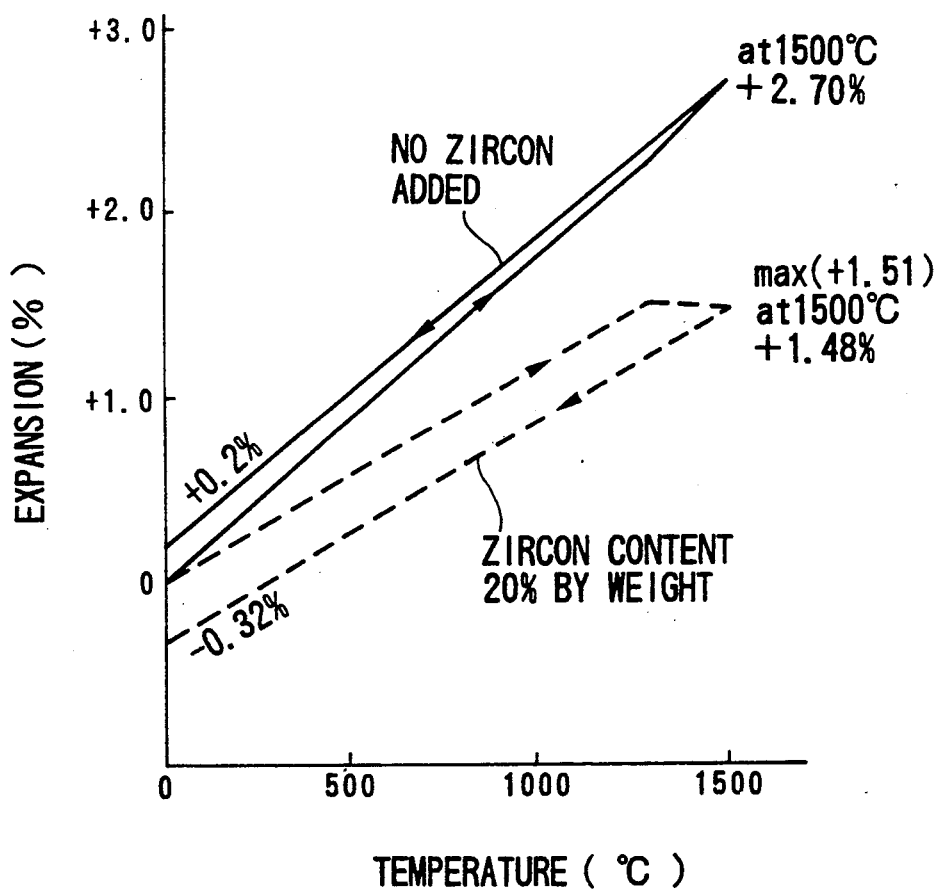
FIG. 2 is a graph showing thermal expansion curves of a material containing no zircon and a material containing 20% of zircon.

FIG. 2 shows thermal expansion of two species of basic casting materials, one incorporating no zircon and the other incorporating 20% by weight of zircon. It is noted from this graph that the incorporation of zircon results in a reduction in thermal expansion. A refractory of small thermal expansion does not readily cause thermal spalling.

Figure 3:
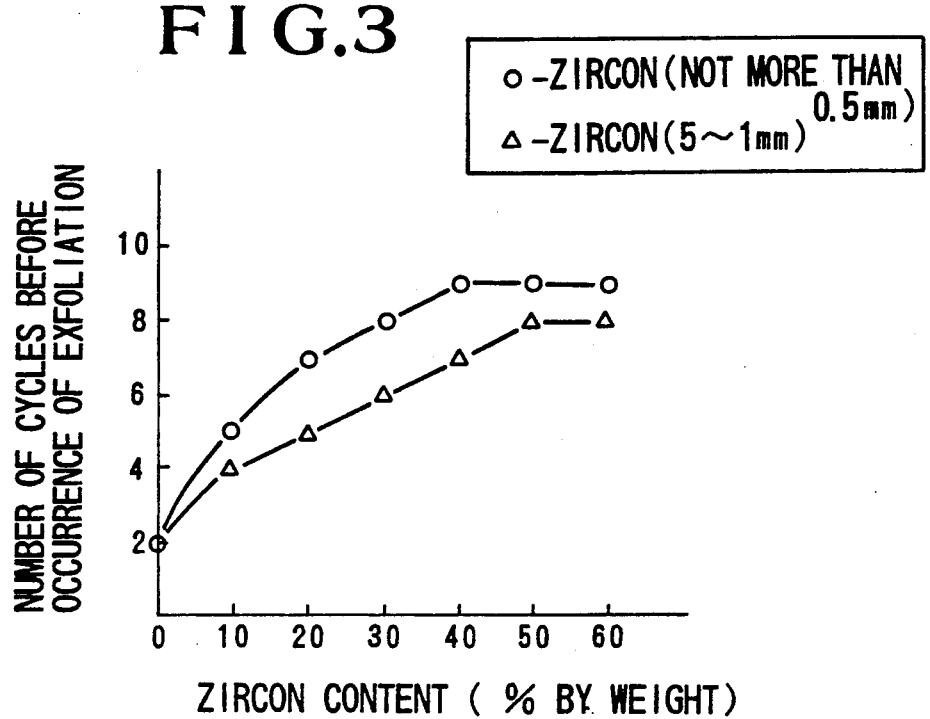
FIG. 3 is a graph showing the relation between the amount of zircon added and the resistance to spalling.

FIG. 3 is a graph showing the relation between the amount of zircon added and the magnitude of resistance to spalling in a one-side heating spalling test performed on a basic casting material. It is clear from the graph that the addition of zircon results in an improvement in the resistance to spalling. It is also seen that the zircon having particle diameters of not more than 0.5 mm is more effective than other sizes of zircon.

In addition, a magnesia-zircon type material produces a liquid phase and induces residual shrinkage due to the dissociation of zircon. This residual shrinkage is a cause of exfoliation.

In this invention the addition of metallic fibers also contributes to prevention of residual shrinkage.

Figure 4:
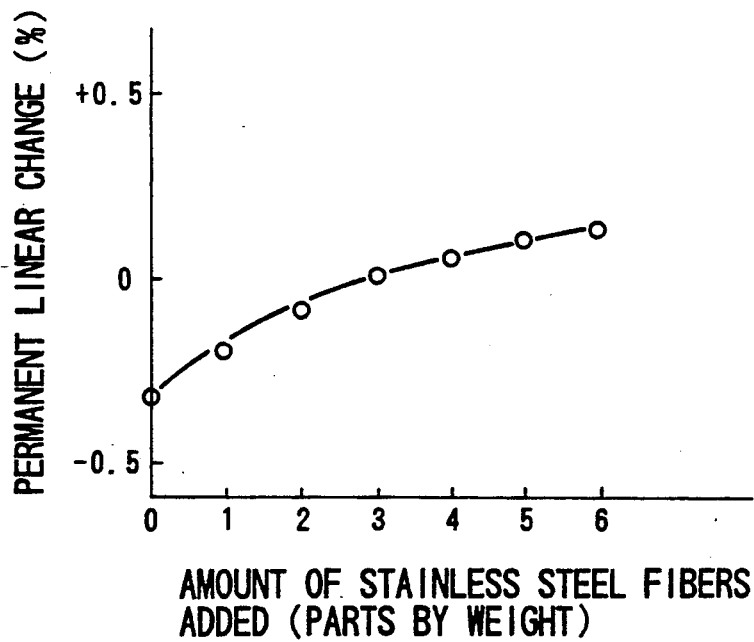
FIG. 4 is a graph showing the relation between the amount of metallic fibers added and the permanent linear change in a material containing 20% of zircon.

FIG. 4 is a graph showing the relation between the amount of metallic fibers (stainless steel fibers, for example) and the permanent linear change in basic casting material containing 20% by weight of zircon. The prevention of residual shrinkage by the addition of metallic fibers may be explained by the theory that metallic fibers occurring in the liquid phase formed by the dissociation of zircon obstruct mutual contact of different portions of the liquid phase and prevent shrinkage due to sintering of the liquid phase.

During casting, a casting material needs a large amount of water. A basic casting material, therefore, has a disadvantage that the MgO component in the magnesia as a raw material undergoes a reaction of hydration and causing embrittlement of the refractory texture. This phenomenon is not observed in a stamping material, which is an unshaped refractory similar to a casting material and which requires addition of water only sparingly at the time of stamping work. In the present invention, the incorporation of zircon mainly in the form of fine particles is effective for preventing hydration and enhances erosion resistance.

Figure 5:
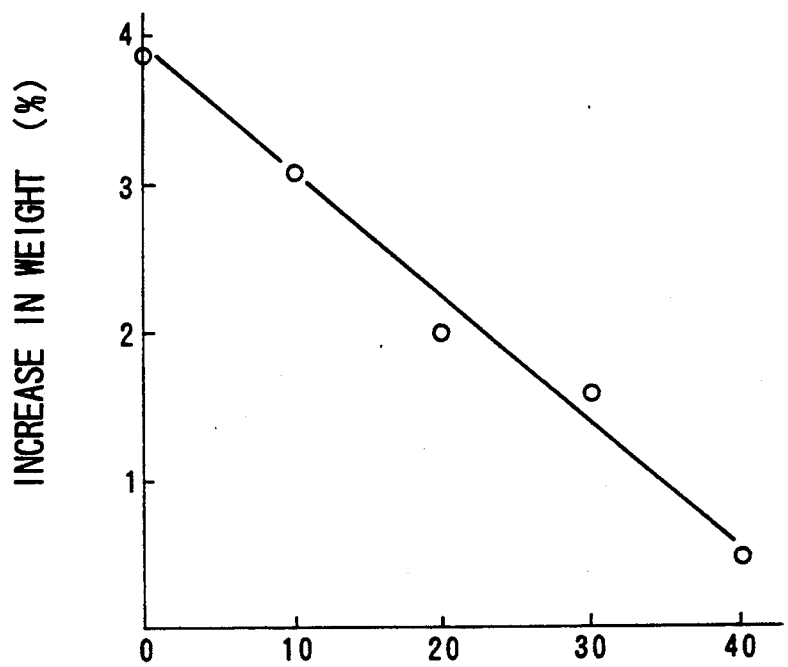
FIG. 5 is a graph showing the relation between the amount of fine zircon particles added and the resistance to hydration.

Generally, a casting material is prepared in the form of particles classifiable as coarse, medium, or fine for the purpose of forming a tightly packed texture and imparting flowability, which is needed during the course of casting work. When the zircon is incorporated mainly in the form of fine particles, the amount of fine particles of magnesia can be decreased proportionately. Since hydration occurs in magnesia in proportion to the specific surface area of the magnesia, a decrease in the amount of fine particles of magnesia prevents hydration. FIG. 5 is a graph showing the relation betwen the proportion of fine particles of zircon having diameters not exceeding 0.5 mm and the extent of hydration in a basic casting material. In the experiment which yielded the data of the graph, the proportion of fine particles not more than 0.5 mm in diameter in the total amount of refractory aggregate was fixed at 40% by weight and the amount of fine magnesium particles was decreased proportionately as the amount of fine zircon particles was increased.

The procedure employed for the tests, the results of which are shown in FIGS. 1 to 5, was identical to that described below in the working examples.

The zircon to be used in this invention may be zircon sand, zircon grog obtained by pelletizing zircon sand, zircon flour obtained by finely pulverizing zircon sand, or ultrafine zircon powder obtained by further finely dividing zircon flour.

The proportion of the zircon to the total amount of the refractory aggregate is in the range of 3 to 40% by weight. If the proportion is less than 3% by weight, the desired effect is not manifested. If it exceeds 40% by weight, the amount of silica liquid formed by dissociation is so large as to impair erosion resistance.

As shown in FIGS. 1, 3 and 5, the zircon can be used in a proportion of 30% weight, in which case the magnesia can be used in a proportion of 70% by weight.

When the zircon is incorporated mainly in the form of fine particles, it is effective for preventing hydration as indicated by the results shown in FIG. 5.

For this purpose, the zircon particles should possess diameters not exceeding 0.5 mm.

Magnesia has excellent resistance to erosion by slag on account of its high melting point. The origin of the magnesia is not important as long the purity of the MgO is not less than 80% by weight. Either electrofused or sintered magnesia may be used in this invention. The magnesia is prepared in the form of particles classifiable as coarse, medium or fine size for the purpose of giving the flowability during course of casting work and the tightness of packing of texture after the casting work similarly to the conventional casting material. When the magnesia is to be used in combination with fine zircon particles, the combination is preferably prepared so that the amount of fine magnesia particles will be decreased.

As respects the proportion of the refractory aggregate other than zircon, magnesia forms a main ingredient as described above. Optionally, a portion of the refractory aggregate may be replaced by some other refractory material on the condition that the replacement does not impair the effect of this invention.

The particular kind of binding agent and the amount of the binding agent to be added are not significantly different from those of binding agents used in conventional casting materials. The binding agents usable in the present invention include alumina cement, phosphates, and silicates, for example. Preferably, the proportion of the binding agent is in the range of 1 to 20 parts by weight based on 100 parts by weight of the refractory aggregate.

Where metallic fibers are to be incorporated, it is mose desirable that the fibers be stainless steel from the viewpoint of resistance to heat. In addition to stainless steel, the metallic fibers can be made of materials selected from iron, carbon steel, Ni-Cr steel, Cr-Mo steel, Cr steel, Cr-V steel, Al, Al alloys, Cu, and alloys, for example. The individual metallic fibers may be straight, curved, angular, or undulating in shape. They are preferably 0.1 to 1 mm in diameter and 5 to 40 mm in length.

The proportion of metallic fibers to be added is suitably set below 7 parts by weight based on the specific gravity of the individual fibers, for example. Even when this proportion is very small, the effect of the addition of these metallic fibers is discernible. Since the metallic fibers are made of a substance with a low melting point, the erosion resistance of the castable refractory is impaired when the amount of the metallic fibers exceeds 7 parts by weight. Preferably, the amount of the metallic fibers is in the range of 1 to 5 parts by weight.

The casting material of this invention, like a conventional casting material, may include a suitable amount of a deflocculant. The proportoin of the deflocculant is preferably not more than 1.0 part by weight, and more preferably in the range of 0.01 to 0.5 part by weight. The deflocculant is at least one substance selected from among such inorganic salts as sodium tripolyphosphate, sodium hexametaphosphate, sodium ultrapolyphosphate, acidic sodium hexametaphosphate, sodium borate, and sodium carbonate and such organic salts as sodium citrate, sodium tartrate, polysodium acrylate, and sodium sulfonaté.

Where a phosphate or a silicate is used as the binding agent, the addition of deflocculant is not required since the binding agent itself possesses a deflocculating activity.

Optionally, the casting material of this invention may further include one or more substances selected from metallic powders, glass powders, clay and silica flours to prevent oxidation and to assist sintering, carbon powders, carbide powders, nitride powders, boride powders, zirconia powders and spinel powders to prevent slag penetration, organic fibers and ceramic fibers to prevent cracking and explosion by drying, as long as the addition does not impair the effect of this invention.

Prior to use, the casting material is kneaded with water added thereto in the range of approximately 3 to 10% by weight of the total amount of the casting material.

Next, a number of examples of this invention and conventional products for comparison will be described.

Table 1 shows components of casting materials used in various experiments and test results.

In each of the experiments, water needed for the casting work was present in an amount of 7.0% by weight against the total amount of the casting material and the casting material consequently prepared for casting work was subjected to casting while being subjected to vibration.

Apparent specific gravity:
This property was determined by drying a cast sample at 110° C. for 24 hours and subjecting the dried sample to measurement in accordance with the procedure of JIS (Japanese Industrial Standard) R2205 with necessary modifications.

Rotary erosion:
Slab:Steel ladle slag=1:1
This test was conducted at 1,650° C. for 4 hours, and the amount of erosion and slag penetration were measured Bending test:
Bending strength was determined by the procedure of JIS R2553 with necessary modifications.

Linear change test:
Linear change was determined by the procedure of JIS R2554 with necessary modifications.

One-side heating spalling:
This property was determined by repeating a cycle consisting of a step of heating a cast sample at 1,400° C. for 30 minutes and a step of forced cooling of the hot sample and finding the number of cycles (indicative of the magnitude of resistance of spalling) preceding the occurrence of exfoliation from the cast sample.

Resistance to hydration:
This property was determined by drying a cast sample at 152° C. under 5 atm. for 3 hours in an autoclave and measuring the ratio of the increase in weight.

Durability in actual machine test:
(1) This property was determined by casting a sample material having a thickness of 280 mm in a slag line which was part of a 250-ton molten steel ladle and examining the product cast piece as to the presence or absence of exfoliation and the number of cycles of use of the ladle.
(2) This property was also determined by casting a sample material with a thickness of 200 mm on the lining of the lower vessel of a 250-ton RH type vacuum degasing furnace and examining the condition of the cast piece as a function of the number of cycles of use.

TABLE 1

Examples of Present Invention and Conventional Products

| | Present Invention | | | | | | | | | Conventional Products for Comparison | | |
|---|---|---|---|---|---|---|---|---|---|---|---|---|
| | 1 | 2 | 3 | 4 | 5 | 6 | 7 | 8 | 9 | 1 | 2 | 3 |
| Components (percent by weight) | | | | | | | | | | | | |
| Magnesia clinker 5 to 1 mm | 45 | 50 | 35 | 35 | | 55 | 60 | 50 | 35 | 50 | 30 | |
| Magnesia clinker Below 1 mm | 25 | 22 | 15 | 25 | 35 | 25 | 20 | 15 | 30 | 30 | 20 | 20 |
| Magnesia clinker Below 74 μm | 25 | 8 | 15 | 25 | 35 | | | 30 | 25 | 20 | | 20 |
| Zircon 5 to 1 mm | | | | 15 | 30 | | | | 10 | | | 60 |
| Zircon Below 0.5 mm (average particle diameter 0.2 mm) | | | 20 | | | | 10 | 5 | | | 25 | |
| Zircon Below 74 μm (average particle diameter 25 μm) | 5 | 20 | 15 | | | 20 | 10 | | | | 25 | |
| Silica Flour | | | | | | | | (2) | | | | |
| Clay | | | | | | | | | (4) | | | |
| Zirconia (percent by weight of refractories) | | | | (4) | | | | | | | | |
| Stainless steel fibers 0.25 mm in diam. × 25 mm in length (percent by weight of refractories) | | | | | (2) | (4) | (7) | (3) | (2) | | | |
| Vinyl fibers 1 denier × 4 mm (percent by weight of refractories) | | | | | (0.1) | | | | | | | |
| High alumina cement (percent by weight of refractories) | (10) | (8) | (7) | | | (5) | (15) | (5) | | (10) | (5) | |
| Sodium silicate (percent by weight of refractories) | | | | (5) | (10) | | | | (10) | | | (10) |
| Sodium tripolyphosphate (percent by weight of refractories) | (0.1) | (0.1) | (0.1) | | | (0.1) | (0.1) | (0.1) | | (0.1) | (0.1) | (0.1) |
| Sodium hexametaphosphate (percent by weight of refractories) | | | | (0.2) | (0.2) | | | | | | | |
| Test | | | | | | | | | | | | |
| Modulus of rupture (kg/cm$^2$) | | | | | | | | | | | | |
| 110° C. × 24 hrs. | 36 | 34 | 30 | 52 | 70 | 71 | 75 | 65 | 52 | 42 | 40 | 53 |
| 1500° C. × 3 hrs. | 173 | 159 | 152 | 215 | 199 | 185 | 196 | 163 | 123 | 317 | 114 | 127 |
| Rotary Erosion (1650° C. × 4 hrs.) | | | | | | | | | | | | |
| Size of erosion (mm) | 5.1 | 5.3 | 5.4 | 5.1 | 5.5 | 5.6 | 5.8 | 5.5 | 5.9 | 5.0 | 9.6 | 10.1 |
| Size of slag penetration (mm) | 3.8 | 3.2 | 3.2 | 5.4 | 4.5 | 3.7 | 3.6 | 3.9 | 5.2 | 10.8 | 3.3 | 4.6 |
| Spalling by one-side heating (Number of cycles before exfoliation) | 4 | 6 | 7 | 5 | 7 | 8 | 9 | 6 | 6 | 2 | 5 | 5 |
| Permanent Linear Change (%) 1500° C. × 3 hrs. | −0.31 | −0.17 | −0.08 | −0.28 | 0.01 | 0.13 | 0.32 | 0.22 | 0.06 | −0.33 | 0.06 | 0.13 |

TABLE 1-continued

| | Examples of Present Invention and Conventional Products | | | | | | | | | | | |
|---|---|---|---|---|---|---|---|---|---|---|---|---|
| | Present Invention | | | | | | | | | Conventional Products for Comparison | | |
| | 1 | 2 | 3 | 4 | 5 | 6 | 7 | 8 | 9 | 1 | 2 | 3 |
| Hydration Resistance (ratio of increase in weight, percent by weight) | 2.4 | 1.2 | 1.4 | 2.2 | 3.3 | 2.5 | 1.7 | 2.8 | 2.1 | 3.8 | 0.8 | 1.8 |
| Field test | | | | | | | | | | | | |
| (1) 250-ton molten steel ladle | | | | | | | | | | | | |
| Extent of exfoliation (large, small, none) | small | small | small | small | none | none | none | none | none | large | small | small |
| Number of cycles of safe use (ch) | 63 | 69 | 70 | 55 | 83 | 110 | 105 | 88 | 75 | 30 | 40 | 42 |
| (2) 250-ton RH lower vessel | | | | | | | | | | | | |
| Number of cycle of safe use (ch) | 343 | 366 | 352 | 338 | 350 | 329 | 361 | 347 | 340 | 219 | 236 | 208 |

The basic casting material obtained in accordance with this invention has excellent resistance to slag penetration and exhibits only small thermal expansion. Therefore it offers high resistance to both structural spalling and thermal spalling.

Dificient resistance to spalling generally constitutes the largest drawback for any basic casting material. Since this invention eliminates this drawback, it enables the outstanding effects inherent in basic casting materials, i.e. high erosion resistance to a highly basic slag and suitability for the production of clean steel, to be manifested to the fullest extent.

The basic casting material described above has small thermal expansion and yet exhibits residual shrinkage. The present invention eliminates this residual shrinkage by additional incorporation of metallic fibers in the basic substance-casting material.

This invention, by using zircon in the form of fine particles not exceeding 0.5 mm in diameter, prevents magnesia from undergoing hydration and enhances erosion resistance more effectively.

What is claimed is:

1. A refractory for casting a basic substance consisting essentially of:
   100 parts by weight of a refractory aggregate having as main ingredients 3 to 30% by weight of zircon and 70 to 97% by weight of magnesia,
   1 to 7 parts by weight of fibers of a metal selected from the group consisting of stainless steel, iron, carbon steel, N-Cr steel, Cr-Mo steel, Cr steel, and Cr-V steel, and
   an effective amount of a binding agent for binding the aggregate.

2. A refractory according to claim 1, wherein said zircon has a particle diameter of not more than 0.5 mm.

3. A refractory according to claim 1, wherein the amount of the binding agent is 1 to 20 parts by weight based on 100 parts by weight of the refractory aggregate.

* * * * *